United States Patent
Ono

(10) Patent No.: US 10,281,901 B2
(45) Date of Patent: May 7, 2019

(54) NUMERICAL CONTROLLER FOR REDUCING CONSUMED POWER IN NON-CUTTING STATE

(71) Applicant: FANUC CORPORATION, Minamitsuru-gun, Yamanashi (JP)

(72) Inventor: Takenori Ono, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 27 days.

(21) Appl. No.: 15/493,999

(22) Filed: Apr. 21, 2017

(65) Prior Publication Data

US 2017/0308059 A1    Oct. 26, 2017

(30) Foreign Application Priority Data

Apr. 25, 2016  (JP) ................................ 2016-086930

(51) Int. Cl.
    G06F 19/00     (2018.01)
    G05B 19/4093   (2006.01)
    G06F 1/3234    (2019.01)

(52) U.S. Cl.
    CPC ....... G05B 19/4093 (2013.01); G06F 1/3234 (2013.01); *G05B 2219/34306* (2013.01);
    (Continued)

(58) Field of Classification Search
    CPC .................................................. G05B 19/182
    (Continued)

(56) References Cited

U.S. PATENT DOCUMENTS 9,494,929 B2 *  11/2016  Haga .................... G05B 19/18
2002/0138171 A1   9/2002  Fukutani
                          (Continued)

FOREIGN PATENT DOCUMENTS

JP       2000-317769 A    11/2000
JP       2009-53801 A      3/2009
                          (Continued)

OTHER PUBLICATIONS

Notification of Reasons for Refusal for Japanese Application No. 2016-086930, dated Apr. 24, 2018, including English translation, 5 pages.
(Continued)

*Primary Examiner* — Suresh Suryawanshi
(74) *Attorney, Agent, or Firm* — RatnerPrestia

(57) ABSTRACT

A numerical controller looks ahead a machining program to detect consecutive non-cutting blocks. The numerical controller calculates first consumed power needed during an execution duration of the non-cutting blocks to shift equipment to a power saving state, operate the equipment in the power saving state, and restore the equipment to a state before the shifting to the power saving state, and second consumed power needed during the execution duration of the non-cutting blocks to operate the equipment without shifting the equipment to the power saving state. When a result of the calculation indicates that the first consumed power is lower than the second consumed power, the numerical controller creates an equipment operation variation pattern according to which the equipment is to be shifted to the power saving state, operated in the power saving state, and then restored to the state before the shifting to the power saving state.

5 Claims, 11 Drawing Sheets

(52) U.S. Cl.
CPC ... *G05B 2219/36086* (2013.01); *Y02P 70/163* (2015.11); *Y02P 90/265* (2015.11)

(58) Field of Classification Search
USPC .......................................................... 700/160
See application file for complete search history.

(56) References Cited

U.S. PATENT DOCUMENTS

| | | | |
|---|---|---|---|
| 2008/0294877 A1* | 11/2008 | Haga | G05B 19/4155 712/216 |
| 2009/0055016 A1 | 2/2009 | Fujibayashi et al. | |
| 2010/0264867 A1 | 10/2010 | Iwashita et al. | |
| 2012/0109359 A1 | 5/2012 | Mizuno et al. | |
| 2015/0012119 A1 | 1/2015 | Koyama | |
| 2015/0205286 A1 | 7/2015 | Mitsuhashi et al. | |
| 2015/0331409 A1* | 11/2015 | Oka | B23K 26/08 700/114 |

FOREIGN PATENT DOCUMENTS

| | | | |
|---|---|---|---|
| JP | 2010-240800 A | | 10/2010 |
| JP | 2010250697 A | | 11/2010 |
| JP | 2011118952 A | | 6/2011 |
| JP | 2012-93975 | | 5/2012 |
| JP | 2013134563 A | | 7/2013 |
| JP | 2014-038482 A | | 2/2014 |
| JP | 2015-13319 A | | 1/2015 |
| JP | 2015-135649 A | | 7/2015 |
| JP | 2016103166 A | * | 6/2016 |
| WO | WO 02/067068 A1 | | 8/2002 |

OTHER PUBLICATIONS

Decision to Grant a Patent for Japanese Application No. 2016-086930, dated Nov. 6, 2018, with translation, 6 pages.

* cited by examiner

FIG.1  Prior Art
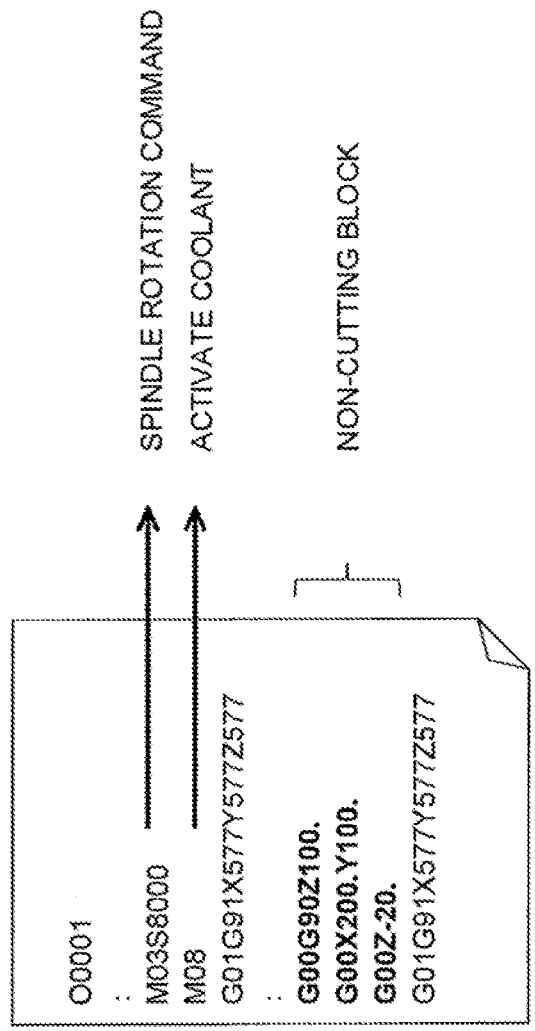
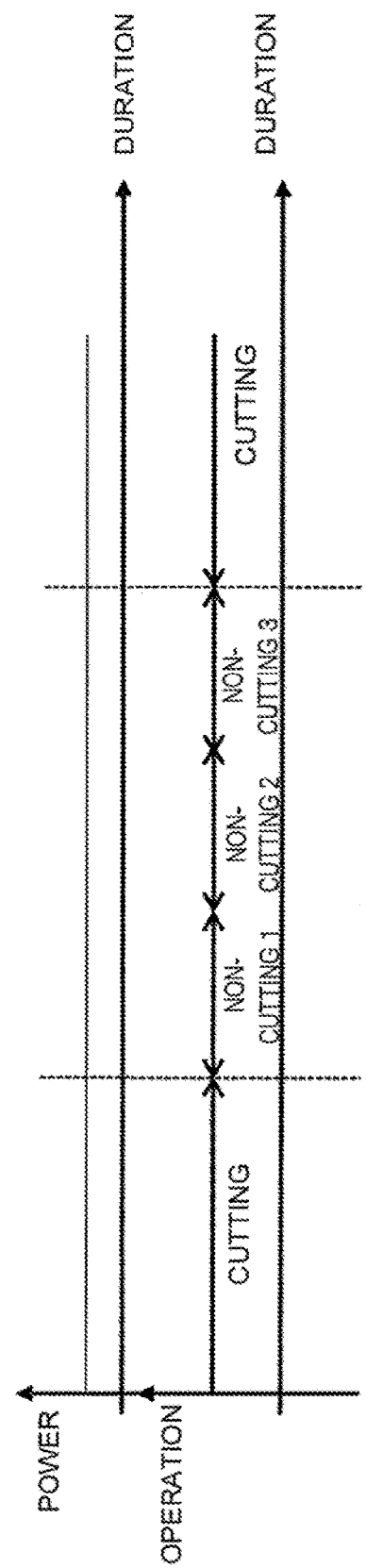

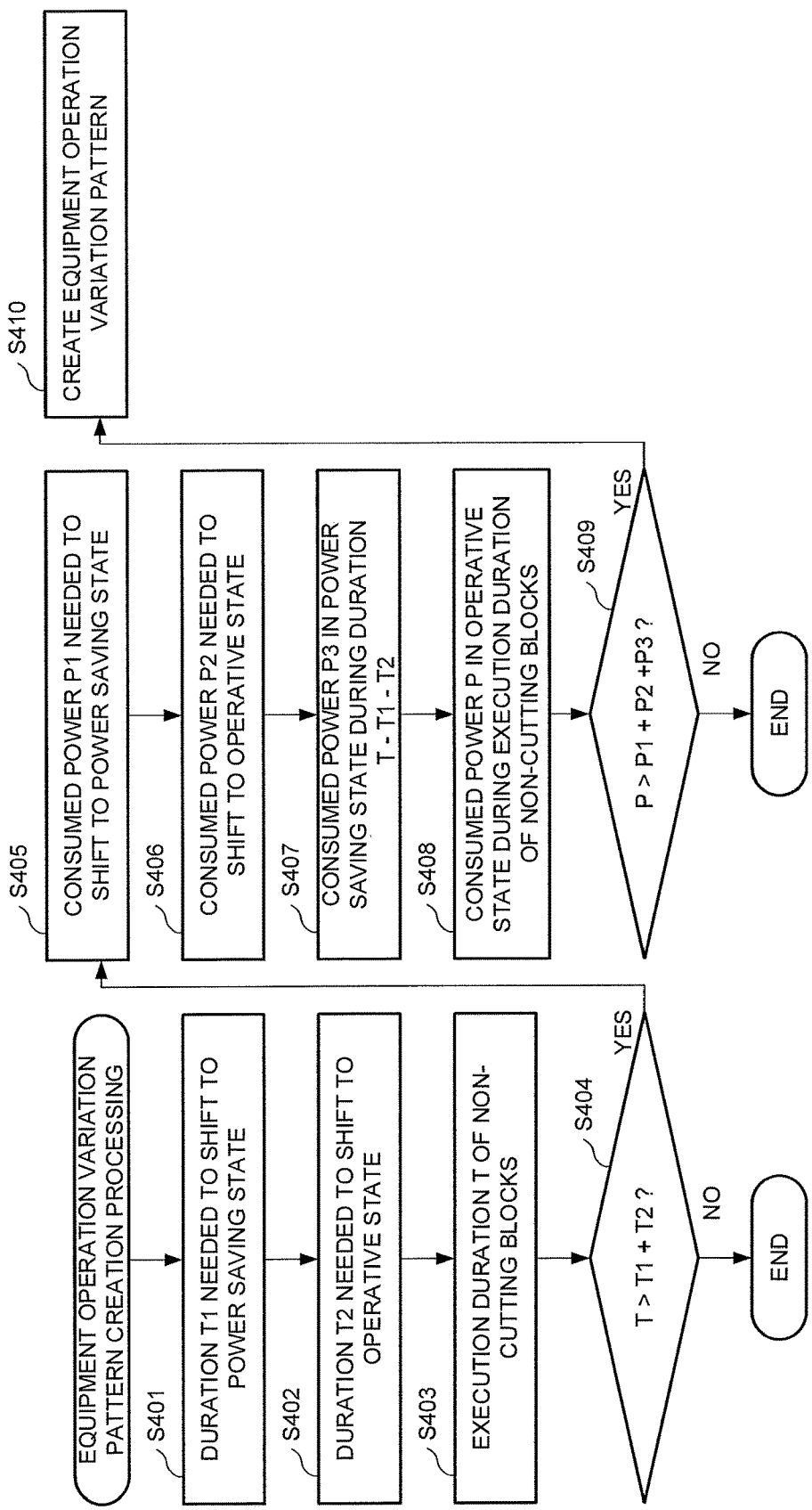

NUMERICAL CONTROLLER FOR REDUCING CONSUMED POWER IN NON-CUTTING STATE

BACKGROUND OF THE INVENTION

1. Field of the Invention

The present invention relates to a numerical controller, and in particular to a numerical controller that enables a reduction in power consumption in a non-cutting state.

2. Description of the Related Art

Conventional numerical controllers continuously operate peripheral equipment such as a shaft, a spindle, and a coolant apparatus (these are hereinafter collectively referred to as equipment) not only in cutting blocks in which workpieces are machined but also in non-cutting blocks in which workpieces are not machined (FIG. 1). In a non-cutting block, equipment often need not be continuously operated, and operation of equipment in a non-cutting block may be a source of unnecessarily power consumption.

However, simply stopping the operation of equipment in a non-cutting block may adversely increase power consumption. FIG. 2 illustrates an example of power consumption in a case where equipment is shifted from an operative state to a power saving state and then from the power saving state to the operative state. In this case, the power saving state refers to, for example, a state where the rotation speed of the spindle is reduced to a predetermined value (including a state where the spindle is deactivated) or a predetermined state where the power consumption of the peripheral equipment is kept lower than in the operative state (including a state where the peripheral equipment is powered off). As illustrated in FIG. 2, consumed power W1 is needed when the equipment shifts from the operative state to the power saving state and when shifting from the power saving state to the operative state, and a difference in consumed power W2 is present between the operative state of the equipment and the power saving state of the equipment. In the case where W1>W2, shifting the equipment from the operative state to the power saving state in the non-cutting block results in an adverse increase in consumed power.

Changing the operation of the equipment in the non-cutting block simply may also affect the equipment or machining. For example, if the spindle or the workpiece is hot, deactivation of the coolant may affect machining. Moreover, attention needs to be paid to the operation of the axis and the spindle because repeated acceleration and deceleration of the shaft and the spindle may cause a motor to generate heat.

As prior art related to power saving, Japanese Patent Application Laid-open No. 2015-135649 describes an NC program generator which identifies a block in which a power source can be deactivated, inserts into an NC program (machining program) an operation code that serves to deactivate the power source when the block is executed, and inserts into the NC program an operation code that serves to reactivate the power source after the block is executed.

WO 2002/067068 describes a numerical controller which acquires, if the machining program contains a non-cutting block, a spindle acceleration and deceleration duration and a spindle deactivation duration extending from the start of the non-cutting block until cutting feeding is started, compares the spindle deactivation duration with the spindle acceleration and deceleration duration, and when the spindle deactivation duration is longer than the spindle acceleration and deceleration duration, deactivates the spindle even if a spindle rotation command is in execution.

Japanese Patent Application Laid-open No. 2000-317769 describes a numerical controller that gives an instruction to stop feeding a cutting fluid except when cutting feeding is performed.

Japanese Patent Application Laid-open No. 2015-13319 describes a controller for peripheral apparatuses that determines operation start timings for the peripheral apparatuses so as to prevent the total of power consumed by the peripheral apparatuses from reaching an upper limit value.

However, in the technique described in Japanese Patent Application Laid-open No. 2015-135649, insertion of the power operation code into the machining program results in an increase in the number of program commands, resulting in the cycle time being disadvantageously increased. Furthermore, variation in the state of the power source depends on the timing when a program command is executed, which also constitutes a disadvantage.

The technique described in WO 2002/067068 only uses a temporal factor to determine whether or not to deactivate the spindle. Thus, the technique fails to appropriately deal with an adverse increase in consumed power or abnormal heat generation in the motor which result from acceleration and deceleration of the spindle.

The technique in Japanese Patent Application Laid-open No. 2000-317769 simply stops the feeding of the cutting fluid during a non-cutting period. Thus, the technique fails to appropriately deal with an adverse increase in consumed power resulting from deactivation of the cutting fluid performed when a non-cutting duration is short, or excessive heat retained in a tool if the cutting fluid is deactivated while the tool is hot.

The technique described in Japanese Patent Application Laid-open No. 2015-13319 controls peak power in a manner such as to prevent the consumed power from exceeding a predetermined upper limit value, the technique not being related to power saving during a non-cutting period.

SUMMARY OF THE INVENTION

The present invention has been developed in order to solve the above-described problems. An object of the present invention is to provide a numerical controller that enables a reduction in consumed power in a non-cutting state.

A numerical controller according to an aspect of the present invention has a program analysis unit that analyzes a machining program and a program execution unit that outputs a program execution command in accordance with the machining program. The program analysis unit looks ahead the machining program to detect one non-cutting block or a plurality of consecutive non-cutting blocks. The program analysis unit calculates first consumed power needed during an execution duration of the non-cutting block to shift equipment to a power saving state, operate the equipment in the power saving state, and restore the equipment to a state before the shifting to the power saving state, and second consumed power needed during the execution duration of the non-cutting block to operate the equipment without shifting the equipment to the power saving state. When a result of the calculation indicates that the first consumed power is lower than the second consumed power, the program analysis unit creates an equipment operation variation pattern according to which the equipment is to be shifted to the power saving state, operated in the power saving state, and then restored to the state before the shifting to the power saving state.

The numerical controller may further have an equipment operation variation pattern execution unit for shifting the equipment to the power saving state, operating the equipment in the power saving state, and restoring the equipment to the state before the shifting to the power saving state, in accordance with the equipment operation variation pattern. The program execution unit may operate the equipment operation variation pattern execution unit when the non-cutting block is executed.

The program execution unit may prevent the equipment operation variation pattern execution unit from operating when a predetermined equipment operation variation enabling condition is not met.

The aspect of the present invention can provide a numerical controller that enables a reduction in consumed power in the non-cutting state.

BRIEF DESCRIPTION OF THE DRAWINGS

FIG. 1 is a diagram illustrating an operation of a conventional numerical controller;

FIG. 5 is a flowchart illustrating processing in which the program analysis unit of the numerical controller in FIG. 3 creates an equipment operation variation pattern;

DETAILED DESCRIPTION OF THE PREFERRED EMBODIMENTS

First, the present invention will be described in brief. A numerical controller 100 according to an embodiment of the present invention suppresses power consumption during a non-cutting period by shifting equipment to a power saving state while avoiding affecting cycle time, subsequent machining, and the state of the equipment. For example, the numerical controller 100 arithmetically checks whether or not consumed power is lower when, during the non-cutting period, control is performed in which the rotation speed of a spindle is decreased or the spindle is deactivated and the rotation speed is restored to an original value before the subsequent cutting is started than when the control is not performed. If the consumed power is lower when the control is performed, the control for a reduction in rotation speed is actually performed.

To change the rotation speed of the spindle, the numerical controller 100 controllably allows the rotation speed of the spindle to be automatically reduced in a non-cutting block and restored when cutting is resumed, without executing any spindle rotation speed command.

If a machining is performed by an axis through a continuous axis operation, the numerical controller 100 automatically controls the operation of the axis so as to automatically change the axis operation in the non-cutting block and return the axis operation to the original state when cutting is resumed, without executing an instruction to change the axis operation. Examples of the machining based on the continuous axis operation include an oscillating operation for grinding such as chopping and such a circular operation of the axis as forms a groove wider than a relevant tool through continuous circular motion.

To change operation of peripheral equipment, the numerical controller 100 controllably allows the peripheral equipment to be automatically kept in the power saving state in the non-cutting block and returned to a steady state, that is, a normal operative state when the cutting is resumed, without executing a program command to execute control command to the peripheral equipment. Examples of the peripheral equipment include a coolant (cutting fluid) apparatus, a cutting chip discharge apparatus, an air blow output apparatus, and a machining state monitoring apparatus based on a camera.

As described above, the numerical controller 100 eliminates the need for a user to execute control command to the equipment. The numerical controller 100 determines whether or not the equipment can be set to the power saving state based on various conditions, and if the equipment can be set to the power saving state, autonomously controllably allows the equipment to be shifted to the power saving state and restored to an operative state.

Figure 2:
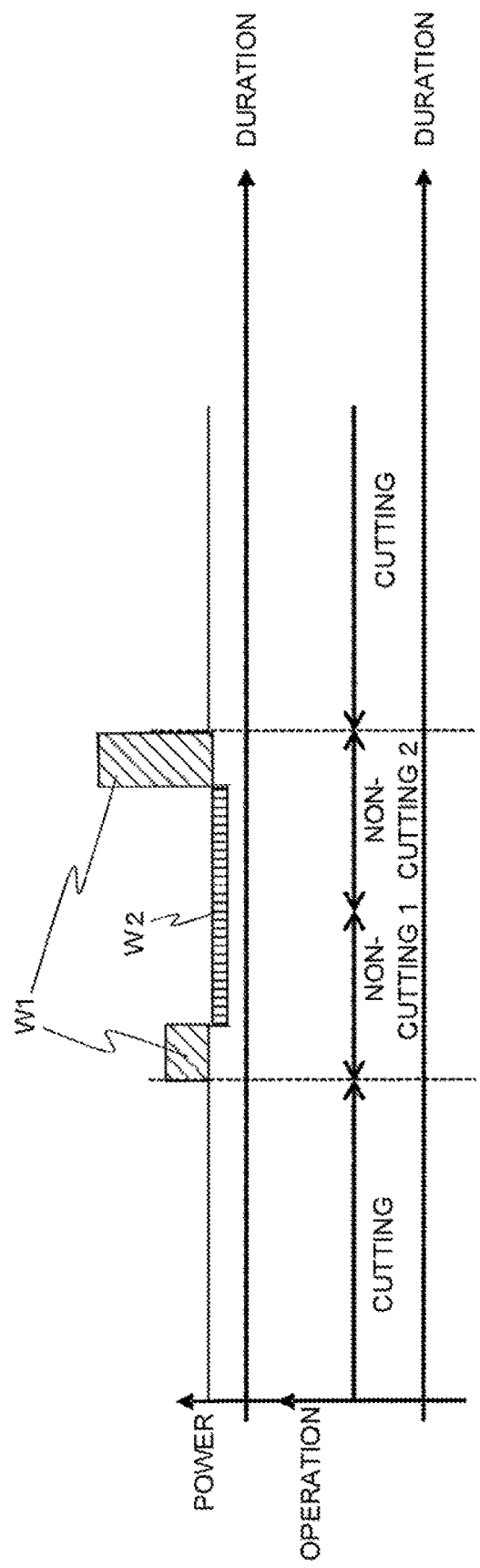
FIG. 2 is a diagram illustrating an example of power consumption in a case where equipment is shifted to a power saving state.
Figure 3:
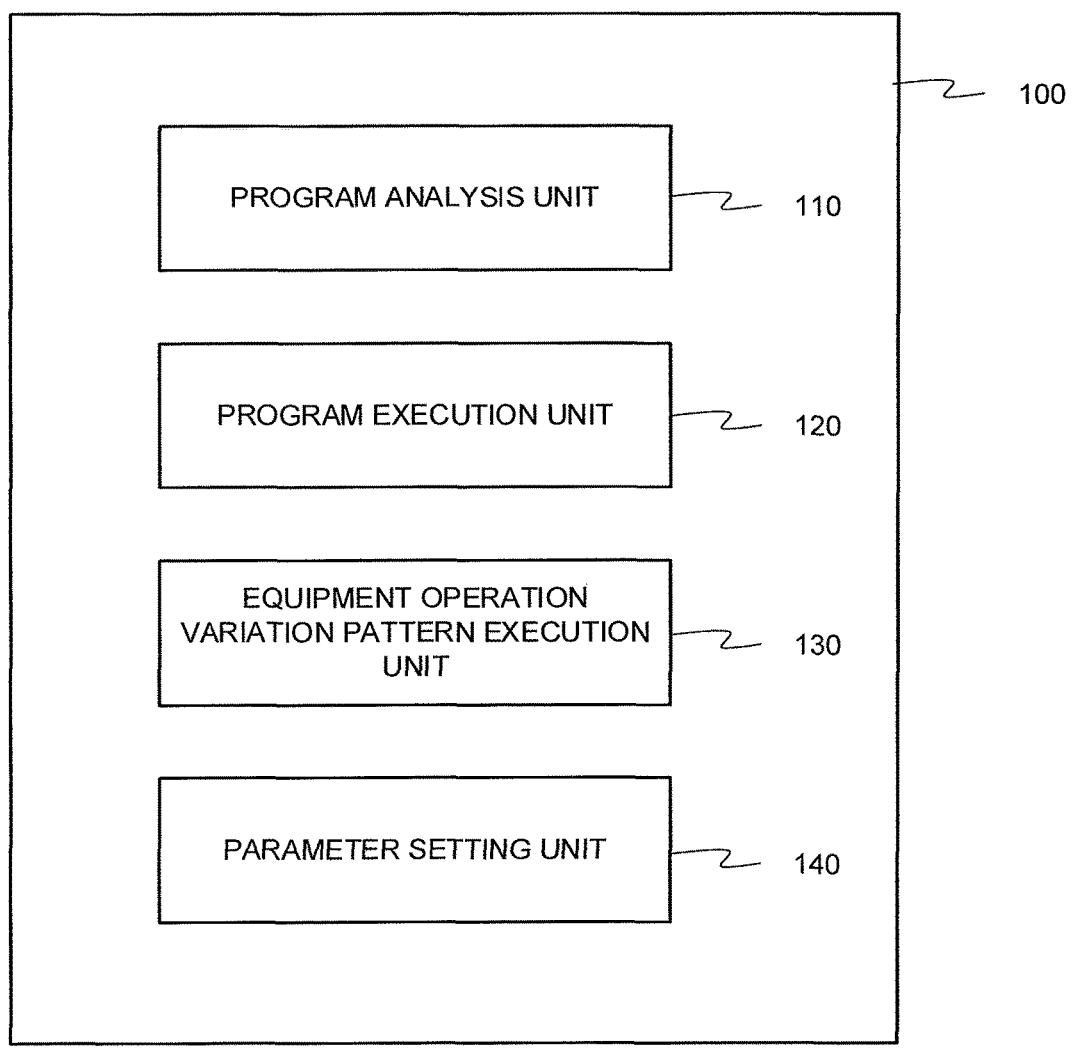
FIG. 3 is a diagram illustrating a configuration of a numerical controller according to an embodiment of the present invention.

Now, a configuration of the numerical controller 100 will be described using a block diagram in FIG. 3. The numerical controller 100 has a program analysis unit 110, a program execution unit 120, an equipment operation variation pattern execution unit 130, and a parameter setting unit 140.

The program analysis unit 110 creates program execution information in accordance with a machining program. The program analysis unit 110 further looks ahead the machining program to discover a non-cutting block or a group of a plurality of consecutive non-cutting blocks (hereinafter simply referred to as non-cutting blocks). The program analysis unit 110 further calculates an execution duration of the non-cutting block.

Determination of the non-cutting block based on look-ahead of the machining program is a well-known technique described in, for example, Japanese Patent Application Laid-open No. 2009-53801. A technique in which a machining duration is estimated by the numerical controller executing a relevant program is well-known and described in, for example, Japanese Patent Application Laid-open No. 2012-93975 and Japanese Patent Application Laid-open No. 2014-38482. The program analysis unit 110 may calculate the execution duration of the non-cutting block, for example, using a relatively simple method as described below.

When the non-cutting block is a positioning block, the execution duration of the non-cutting block can be calculated, for example, from set values for a traveling distance, a rapid traverse speed of an operating axis, and acceleration and deceleration thereof. The set value for acceleration and deceleration refers to, e.g., a time constant (the duration needed for the operating axis to reach the rapid traverse speed) or an acceleration that is set for each numerical controller 100. When the non-cutting block is an auxiliary-function command block, for example, the execution duration needed when the auxiliary function operates is pre-recorded in a storage area not depicted in the drawings so that the program analysis unit 110 reads the recorded value. When the non-cutting block corresponds to a dwell command, a commanded duration corresponds to the execution duration. The set value for the acceleration is not limited to the above-described value but may be, for example, a time constant with which the acceleration is varied or the amount of variation in acceleration.

The program analysis unit 110 further calculates power consumed when the equipment continues to operate during the execution duration of the non-cutting block. The program analysis unit 110 further calculates power consumed during the execution duration of the non-cutting block to shift the equipment to the power saving state, operate the equipment in the power saving state, and restore the equipment to the original operative state before execution of the subsequent cutting block is started. The program analysis unit 110 determines whether or not the power consumed when the equipment is set to the power saving state is equal to or lower than the power consumed when the equipment continues to operate.

The program analysis unit 110 can pre-measure the power consumed in the operative state and the power saving state per unit time and the power consumed for shifting from the operative state to the power saving state and from the power saving state to the operative state, and store the resultant values. The program analysis unit 110 can use the stored values to calculate the consumed power in various states of the equipment. For example, for the axis operation, the program analysis unit 110 pre-measures the consumed power for each of acceleration, constant speed operation, and deceleration, and stores the resultant values.

The power saving state of the equipment may be a state where the equipment is deactivated or where any operation is performed which consumes lower power than in the operative state in the cutting block. The number of power saving states need not be one but a plurality of power saving states may be present. For example, for the axis operation, the power saving state can be created by adjusting the speed of the axis and the acceleration and deceleration to values smaller than the corresponding values used in the operative state in the cutting block.

Upon determining that the consumed power can be suppressed by setting the equipment to the power saving state, the program analysis unit 110 creates an equipment operation variation pattern that is a scenario for variation of the operation of the equipment. The equipment operation variation pattern includes information on the duration needed for a change from the operative state to the power saving state, the duration needed for a change from the power saving state to the operative state, and the duration for which the power saving state is maintained.

For the duration needed for shifting from the operative state to the power saving state and the duration needed for shifting from the power saving state to the operative state, pre-measured values may be stored and used when needed.

When the speed of the axis operation is reduced to shift to the power saving state, a shifting duration can be determined from the acceleration preset in the numerical controller 100 and the fluctuation range of the speed. Alternatively, the shifting duration may be determined from the time constant preset in the numerical controller 100.

When a single power saving state is determined for the equipment, the program analysis unit 110 can create an equipment operation variation pattern based on the above-described shifting duration and the execution duration of the non-cutting block. When a plurality of power saving states are present, the program analysis unit 110 preferably selects an equipment operation variation pattern that serves to reduce the consumed power. The equipment operation variation pattern that serves to reduce the consumed power can typically be determined by complete inspection (see FIG. 6; this will be described below in detail) or a bisection method.

Now, a technique for selecting an equipment operation variation pattern by the bisection method will be described. For example, for the consumed power, an equipment operation variation pattern A with shifting to the power saving state with the rotation speed of the spindle set to 0 is compared with an equipment operation variation pattern B with shifting to a power saving state with the rotation speed of the spindle reduced to half of the current rotation speed. If the equipment operation variation pattern B involves lower consumed power, the pattern B is determined to be a temporary solution. Then, for the consumed power, an equipment operation variation pattern C with shifting to a power saving state with the rotation speed of the spindle reduced to a quarter of the current rotation speed that is smaller than the temporary solution is compared with an equipment operation variation pattern D with shifting to a power saving state with the rotation speed of the spindle reduced to three-fourths of the current rotation speed that is greater than the temporary solution. Similar calculations are subsequently repeated to enable an equipment operation variation pattern with the lowest consumed power to be obtained.

For the axis operation, the consumed power is reduced by performing acceleration and deceleration with the acceleration reduced. Thus, the power saving state may be created by varying the acceleration or the time constant. In this case, the program analysis unit 110 may create a plurality of equipment operation variation patterns having different acceleration or time constants and each of which is a combination of the acceleration, the time constant, and the operating state of the shaft, and select one of the equipment operation variation patterns that involves lower consumed power.

The program execution unit 120 creates program execution commands in accordance with program execution information. The program execution unit 120 further determines whether or not an equipment operation variation enabling condition is met once execution of the non-cutting block is started. The equipment operation variation enabling condition allows determination of whether or not to shift the equipment to the power saving state in accordance with the equipment operation variation pattern. For example, the equipment operation variation enabling condition is, for the peripheral equipment, the condition that the temperature of a tool, the temperature of a workpiece, the amount of cutting chips, or the like does not exceed a predetermined threshold, and for the axis operation, the condition that the temperature of the shaft, a loading state of the shaft, or the like does not exceed a predetermined threshold. Specifically, the program execution unit 120 may controllably avoid stopping the injection of the coolant (avoid shifting to the power saving state) if the temperature of the tool is higher than a predetermined degrees.

Various values used for the condition determinations can typically be acquired from signals input to the numerical controller 100. For example, for the axis operation, a value from the sensor attached to the motor is input to the numerical controller 100, and the program execution unit 120 makes determination through comparison of the input value with a preset threshold. Alternatively, an auxiliary-function command in the non-cutting block enables acquisition of a value used for determination. Alternatively, a value can be acquired from any type of external equipment. For example, a thermograph may measure the temperature of the tool or the workpiece, and the numerical controller 100 may acquire the temperature from the thermograph. The content of the equipment operation variation enabling condition, that is, the value, threshold, etc. used for determination, may be optionally set for each piece of the equipment. The equipment operation variation enabling condition need not necessarily be set.

The program execution unit 120 makes an equipment operation variation pattern execution request if the equipment operation variation enabling condition is met or is not set.

In response to the equipment operation variation pattern execution request, the equipment operation variation pattern execution unit 130 varies the operation of the equipment in accordance with the equipment operation variation pattern. That is, the equipment operation variation pattern execution unit 130 shifts the equipment to the power saving state, operates the equipment in the power saving state for a given duration, and then restores the equipment to the operative state before execution of the subsequent cutting block is started.

The execution duration of the non-cutting block is only an estimated duration. Thus, the equipment operation variation pattern execution unit 130 may execute the equipment operation variation pattern while correcting the equipment operation variation pattern in accordance with the actual execution duration of the non-cutting block. For example, if the execution duration of the non-cutting block is extended, the duration for which the power saving state is maintained is correspondingly extended to allow delay of the start of shifting to the operative state.

The parameter setting unit 140 is an interface configured to set the above-described equipment operation variation enabling condition. The user can set, via the parameter setting unit 140, the content of the equipment operation variation enabling condition, that is, the value, threshold, etc. used for determination.

Now, using flowcharts in FIGS. 4A to 7, operations of units of the numerical controller 100 (FIG. 3) will be described.

Figure 4A:
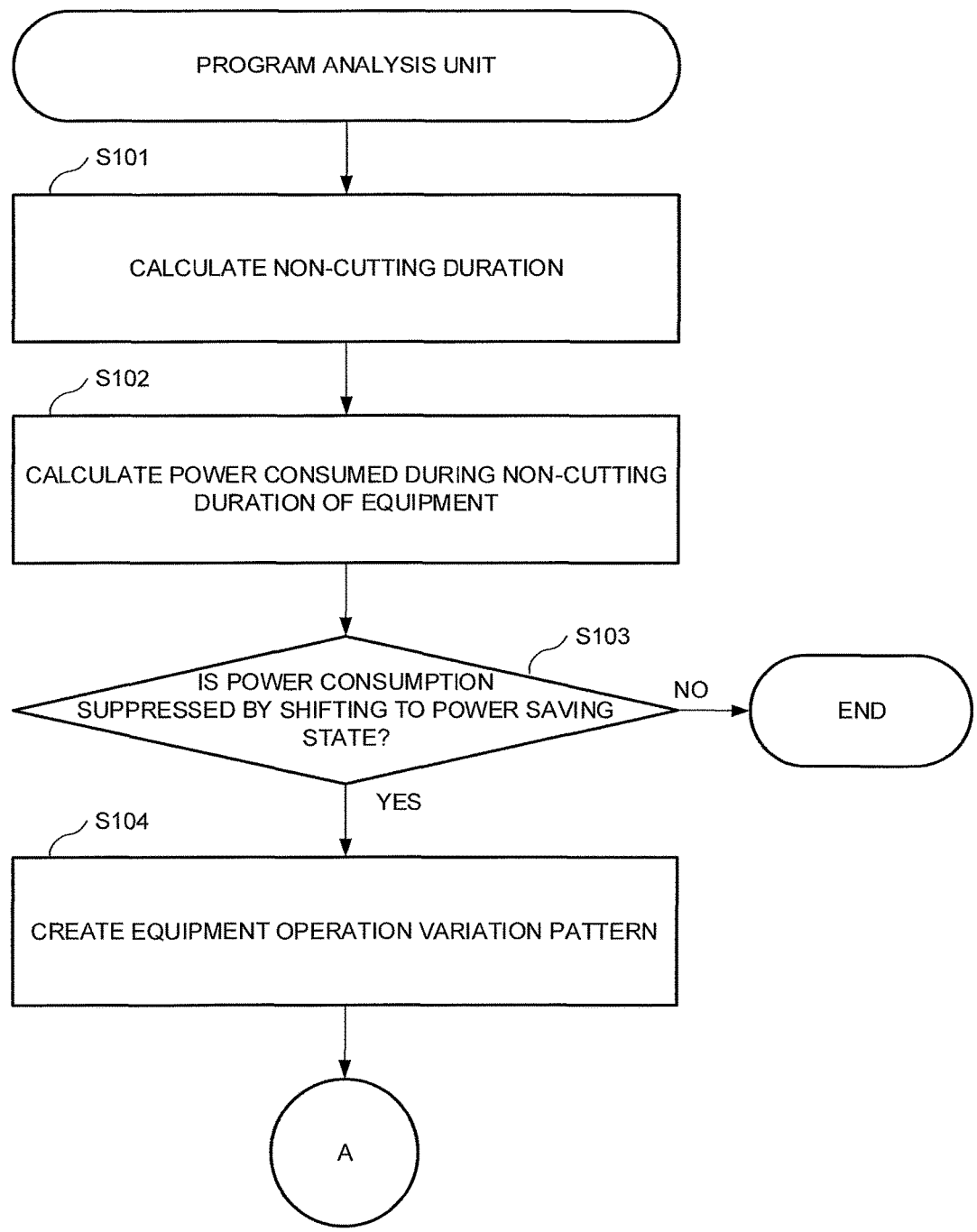
FIG. 4A is a flowchart illustrating a sequence of operations of a program analysis unit of the numerical controller in FIG. 3.

FIG. 4A is a flowchart illustrating a sequence of operations of the program analysis unit 110 of the numerical controller 100.

Step S101: The program analysis unit 110 looks ahead the machining program to discover a non-cutting block and calculates the execution duration of the non-cutting block.

Step S102: The program analysis unit 110 calculates the power consumed when the equipment continues to operate during the execution duration of the non-cutting block.

Step S103: The program analysis unit 110 determines whether or not power consumption can be suppressed by shifting the equipment to the power saving state. When suppression of power consumption is possible, the processing proceeds to step S104. When suppression of power consumption is impossible, the processing is ended.

Step S104: The program analysis unit 110 creates an equipment operation variation pattern that enables power consumption to be suppressed. This allows determination of the duration needed for a change from the operative state to the power saving state, the duration needed for a change from the power saving state to the operative state, and the duration for which the power saving state is maintained. To what type of power saving state the equipment is to be shifted is also determined.

Figure 4B:
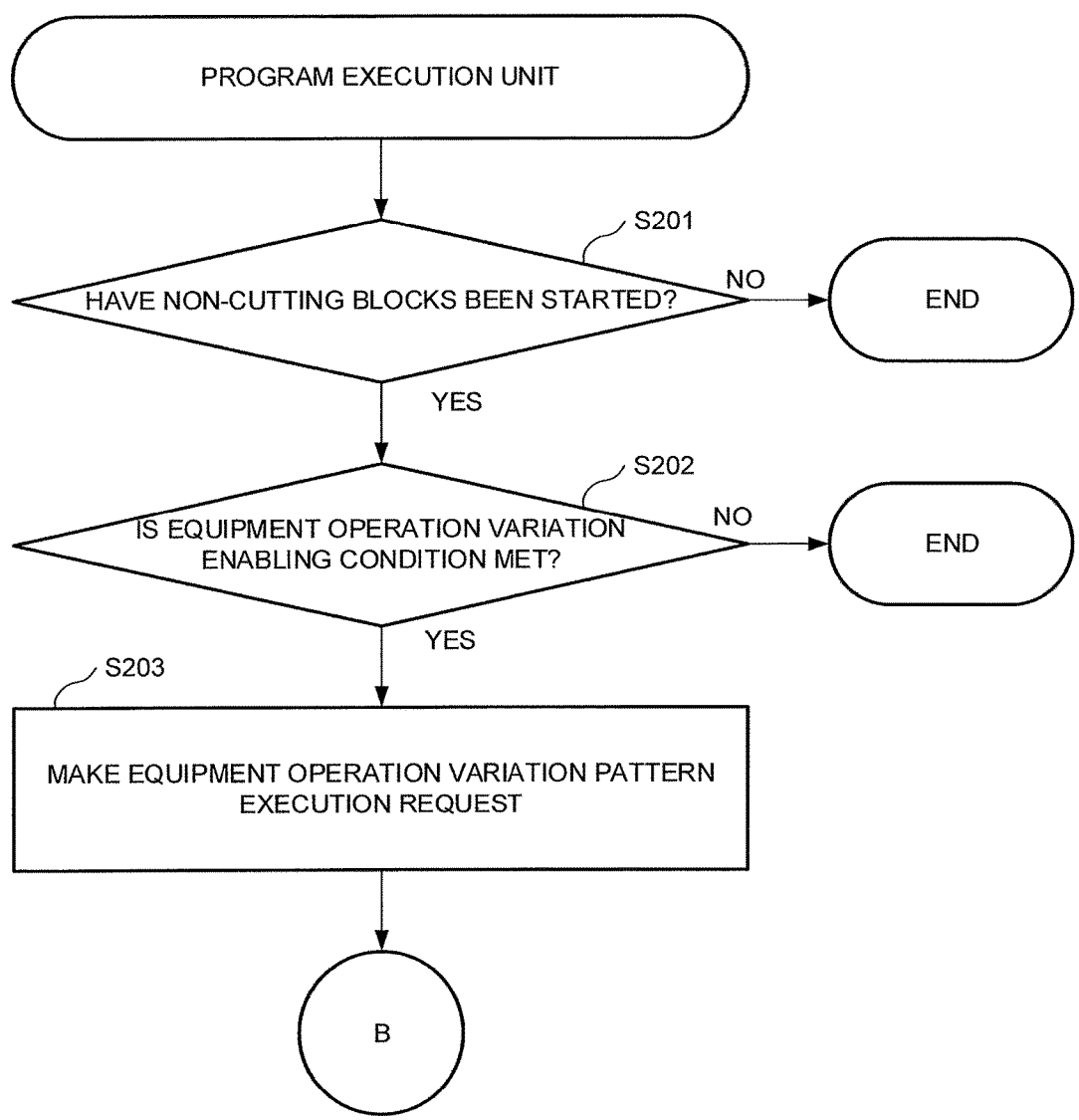
FIG. 4B is a flowchart illustrating a sequence of operations of a program execution unit of the numerical controller in FIG. 3.

FIG. 4B is a flowchart illustrating a sequence of operations of the program execution unit 120 of the numerical controller 100.

Step S201: Upon sensing the start of execution of the non-cutting block, the processing proceeds to step S202. Upon failing to sense the start of execution of the non-cutting block, the processing is ended.

Step S202: The program execution unit 120 determines whether or not the equipment operation variation enabling condition is met. When the equipment operation variation enabling condition is met or is not set, the processing proceeds to step S203. When the equipment operation variation enabling condition is not met, the processing is ended.

Step S203: The program execution unit 120 makes an equipment operation variation pattern execution request to invoke the equipment operation variation pattern execution unit 130.

Figure 4C:
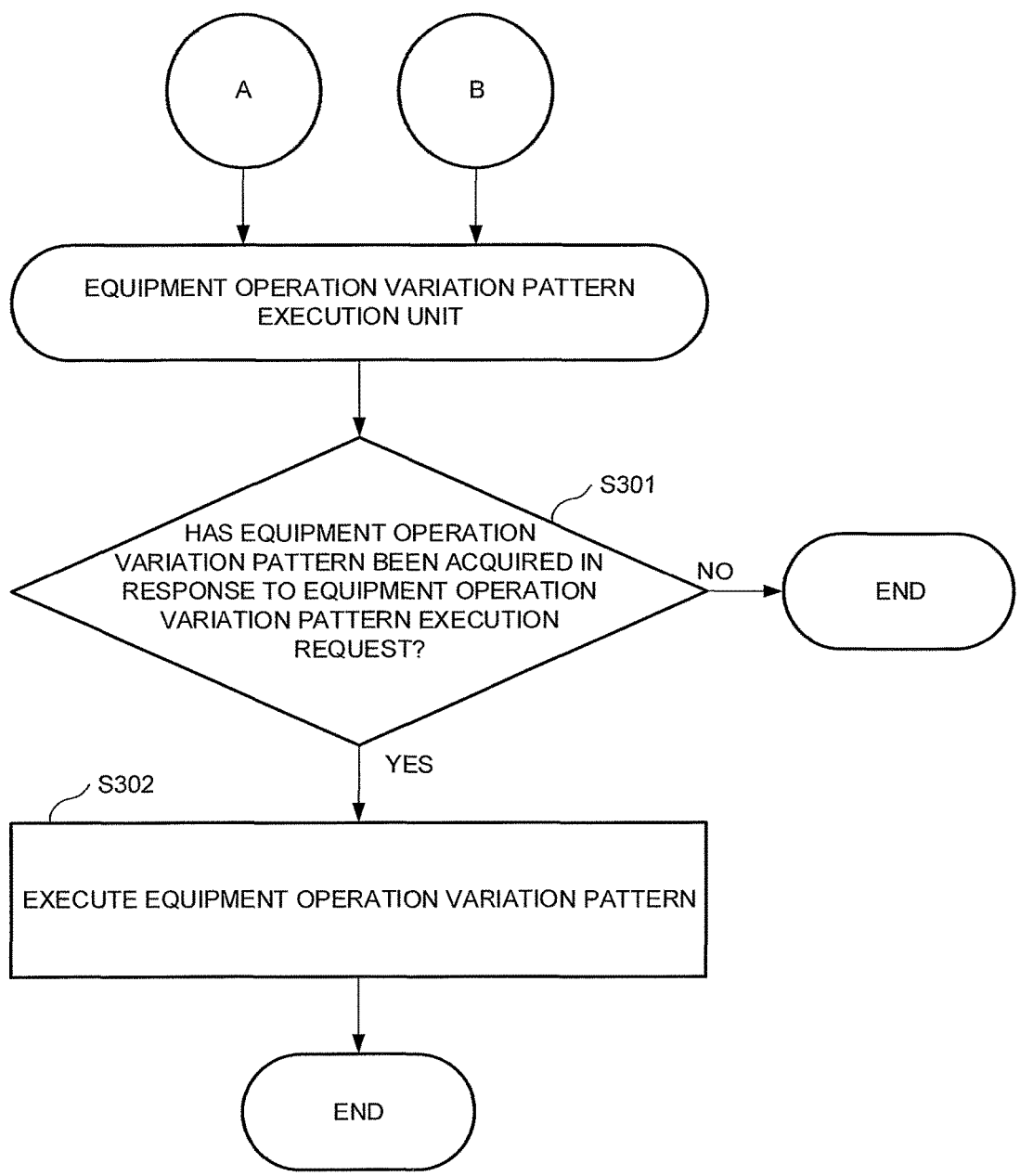
FIG. 4C is a flowchart illustrating a sequence of operations of an equipment operation variation pattern execution unit of the numerical controller in FIG. 3.

FIG. 4C is a flowchart illustrating a sequence of operations of the equipment operation variation pattern execution unit 130 of the numerical controller 100.

Step S301: In response to the equipment operation variation pattern execution request, the equipment operation variation pattern execution unit 130 acquires an equipment operation variation pattern in accordance with the equipment operation variation pattern execution request. Upon normally acquiring the equipment operation variation pattern, the processing proceeds to step S302. Upon failing to acquire the equipment operation variation pattern normally, the processing is ended.

Step S302: The equipment operation variation pattern execution unit 130 varies the operation of the equipment in accordance with the acquired equipment operation variation pattern.

FIG. 5 is a flowchart illustrating processing in which the program analysis unit 110 of the numerical controller 100 creates an equipment operation variation pattern.

Step S401: The program analysis unit 110 calculates a duration T1 needed to shift the equipment from the operative state to the power saving state.

Step S402: The program analysis unit 110 calculates a duration T2 needed to shift the equipment from the power saving state to the operative state.

Step S403: The program analysis unit 110 calculates an execution duration T for the non-cutting block.

Step S404: The program analysis unit 110 determines whether or not T>T1+T2. When T>T1+T2, the processing proceeds to step S405. When T≤T1+T2, the equipment operation variation pattern fails to hold true, and the processing is ended.

Step S405: The program analysis unit 110 calculates consumed power P1 needed to shift the equipment from the operative state to the power saving state.

Step S406: The program analysis unit 110 calculates consumed power P2 needed to shift the equipment from the power saving state to the operative state.

Step S407: The program analysis unit 110 calculates consumed power P3 consumed during the duration (=T−T1−T2) in which the equipment is kept in the power saving state.

Step S408: The program analysis unit 110 calculates consumed power P consumed when the equipment is kept in the operative state in the non-cutting block. In this case, the equipment is kept in the operative state for the duration T.

Step S409: The program analysis unit 110 determines whether or not P>P1+P2+P3. When P>P1+P2+P3, the processing proceeds to step S410. When P≤P1+P2+P3, the equipment operation variation pattern fails to hold true, and the processing is ended.

Step S410: The program analysis unit 110 creates an equipment operation variation pattern. The created equipment operation variation pattern allows shifting of the equipment to the power saving state to be started at a point in time to start the non-cutting block and allows shifting of the equipment to the operative state to be started a duration T−T2 after the start of shifting to the power saving state.

Figure 6:
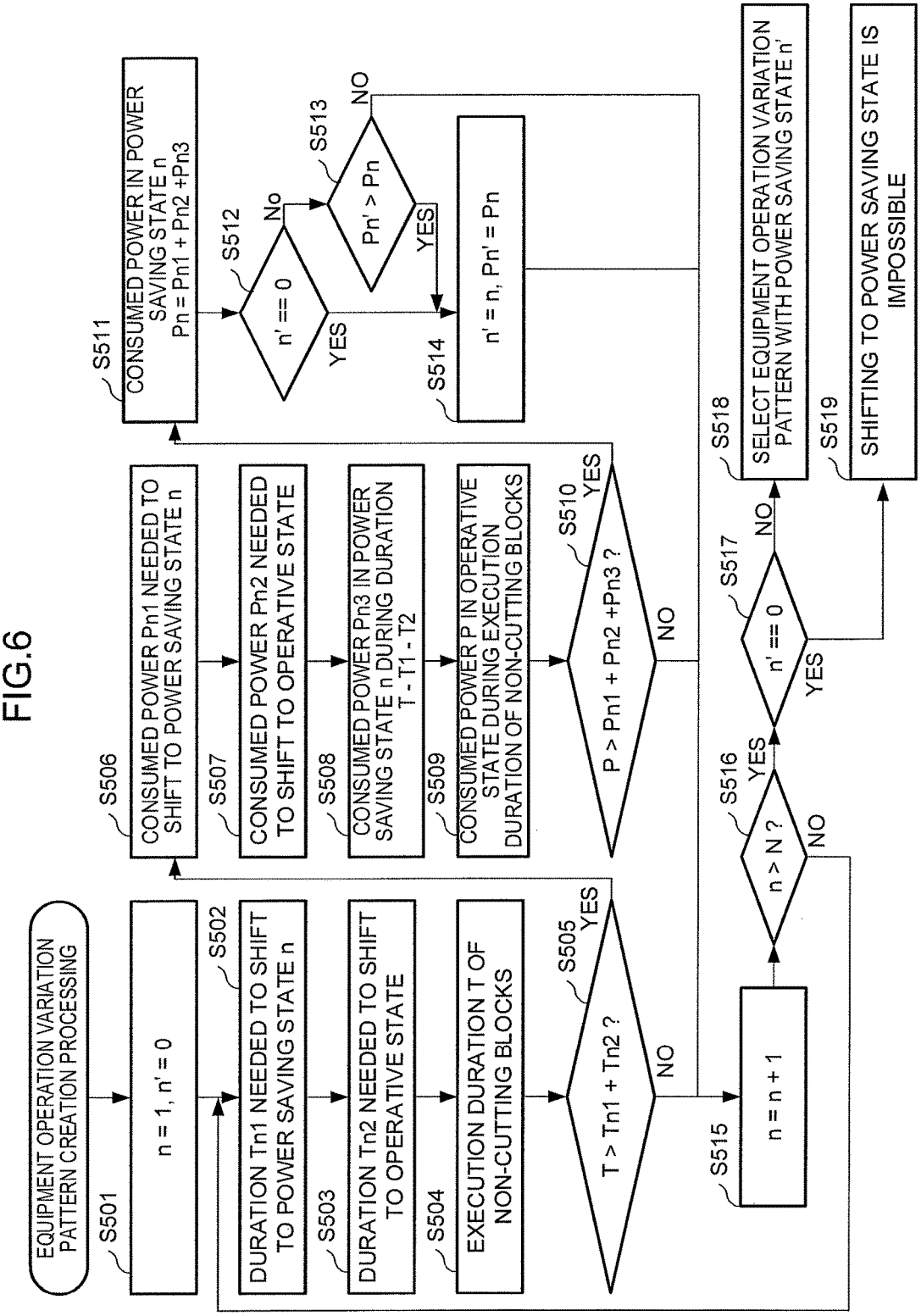
FIG. 6 is a flowchart illustrating processing in which the program analysis unit of the numerical controller in FIG. 3 selects an equipment operation variation pattern.

FIG. 6 is a flowchart illustrating processing in which the program analysis unit 110 of the numerical controller 100 selects an equipment operation variation pattern by complete inspection.

The program analysis unit 110 calculates the consumed power in the equipment operation variation pattern for all of N power saving states to identify an equipment operation variation pattern with the lowest consumed power.

Step S501: For a power saving state n, calculation of the consumed power is started.

Steps S502 to S511: As is the case with steps S401 to S409, the program analysis unit 110 calculates a duration Tn1 and consumed power Pn1 needed to shift the equipment from the operative state to the power saving state n, a duration T for which the power saving state is maintained and consumed power Pn3 during the duration T, and a duration Tn2 and consumed power Pn2 needed to shift the equipment from the power saving state to the operative state. The program analysis unit 110 further calculates the consumed power Pn (=Pn1+Pn2+Pn3) in the equipment operation variation pattern with the power saving state n.

When the equipment operation variation pattern with the power saving state n does not hold true (in S505 and S510, No), the processing proceeds to step S515.

Steps S512 to S514: Upon having successfully created the equipment operation variation pattern with the power saving state n, the program analysis unit 110 compares the consumed power Pn in the equipment operation variation pattern with the power saving state n with the lowest consumed power Pn' in one of the other previously created equipment operation variation patterns. When the result of the comparison indicates Pn'>Pn, this means that the equipment operation variation pattern with the power saving state n is the equipment operation variation pattern with the lowest consumed power. In this case, the power saving state n is saved as n'.

Steps S515 to S516: The program analysis unit 110 repeats the processing in step S502 and the subsequent steps until all of the N power saving states are checked.

Steps S517 to S519: The program analysis unit 110 selects the equipment operation variation pattern with the power saving state n as the equipment operation variation pattern with the lowest consumed power. If n' is 0, that is, no effective equipment operation variation pattern has been successfully created, shifting to the power saving state is precluded.

Figure 7:
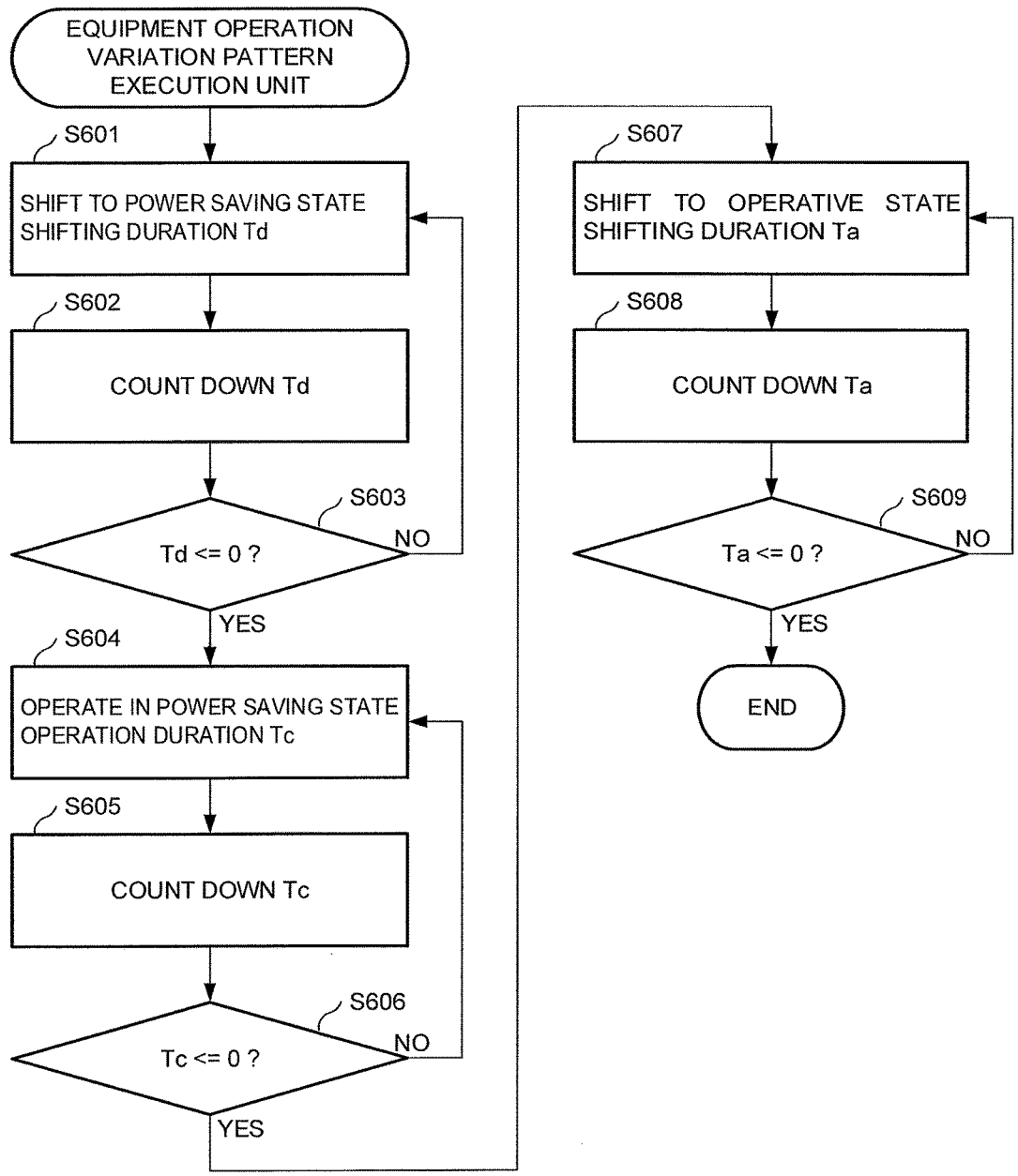
FIG. 7 is a flowchart illustrating processing in which the equipment operation variation pattern execution unit of the numerical controller in FIG. 3 varies operation of equipment.

FIG. 7 is a flowchart illustrating processing in which the equipment operation variation pattern execution unit 130 of the numerical controller 100 varies the operation of the equipment in accordance with the equipment operation variation pattern.

Step S601: Upon sensing an equipment operation variation pattern execution request, the equipment operation variation pattern execution unit 130 starts processing of shifting the equipment from the operative state to the power saving state.

Step S602: The equipment operation variation pattern execution unit 130 starts counting down a duration Td needed to shift the equipment from the operative state to the power saving state.

Step S603: The processing of shifting to the power saving state lasts until the duration Td elapses. When the duration Td elapses, the processing proceeds to step S604.

Step S604: The equipment operation variation pattern execution unit 130 allows the equipment to start operating in the power saving state.

Step S605: The equipment operation variation pattern execution unit 130 starts counting down a duration Tc for which the equipment is to be kept in the power saving state.

Step S606: The operation in the power saving state lasts until the duration Tc elapses. When the duration Tc elapses, the processing proceeds to step S607.

Step S607: The equipment operation variation pattern execution unit 130 starts processing of shifting the equipment from the power saving state to the operative state.

Step S608: The equipment operation variation pattern execution unit 130 starts counting down a duration Ta needed to shift the equipment from the power saving state to the operative state.

Step S609: The processing of shifting to the operative state lasts until the duration Ta elapses. When the duration Ta elapses, the equipment operation variation pattern execution unit 130 ends the processing.

Now, embodiments will be described in which the numerical controller 100 suppresses power consumption in the non-cutting block.

Embodiment 1

In this embodiment, the numerical controller 100 suppresses power consumption by stopping in the non-cutting block the operation (coolant injection) of the coolant apparatus which is a peripheral equipment.

In the present embodiment, the power consumed per unit time during steady injection of the coolant and the power consumed per unit time during stoppage of injection of the coolant are preset in the numerical controller 100 so that the program analysis unit 110 can reference these values. As the equipment operation variation enabling condition, an upper limit value of the temperature of the tool at which the injection of the coolant can be stopped is also preset in the numerical controller 100 so that the program execution unit 120 can reference this value. The tool temperature can be determined by the numerical controller 100.

In the present embodiment, the power saving state is the state where the injection of the coolant is stopped. The equipment operation variation pattern execution unit 130 controllably activates or deactivates the coolant (the injection thereof) in accordance with signals assigned at M08 and M09, respectively. That is, in accordance with the equipment operation variation pattern, the equipment operation variation pattern execution unit 130 performs the allocated signal operation at the timing to activate or deactivate the coolant.

Normally, the only control operation that the equipment operation variation pattern execution unit 130 can perform on the coolant is to activate or deactivate the injection of the coolant in a switching manner. In this case, a given duration needs to elapse from issuance of a coolant deactivation command until the injection of the coolant is stopped, and at this time, power (regenerative power) is consumed. A given duration also needs to elapse from issuance of a coolant activation command until the coolant is steadily injected, and at this time, power is consumed. Thus, the numerical controller 100 pre-measure and store the above-described durations and consumed power so that the program analysis unit 110 can reference these values.

The program analysis unit 110 looks ahead the machining program, detects a non-cutting block present between cutting blocks, and calculates an execution duration Tn for the non-cutting block. The execution duration Tn includes a positioning duration, the execution duration of the auxiliary-function command, and the execution duration of the dwell command. The positioning duration can be calculated from a set value and a command moving distance. The execution duration of the auxiliary-function command may be an execution duration preset for each command. The execution duration of the dwell command corresponds to a command duration.

The program analysis unit 110 calculates the power consumed when the coolant is continuously injected for the duration Tn. The program analysis unit 110 also calculates the total power consumed if, within the duration Tn, the injection of the coolant is stopped, and after a standby state, is started again. The program analysis unit 110 creates an operation variation pattern for the coolant apparatus when stoppage of injection of the coolant reduces the consumed power.

When execution of the non-cutting block is started immediately after the cutting block, the program execution unit 120 determines whether or not the operation variation enabling condition for the coolant apparatus is met, that is, whether the tool temperature is equal to or lower than a predetermined threshold. When the operation variation enabling condition is met, the equipment operation variation pattern execution unit 130 varies the operation of the coolant in accordance with the operation variation pattern.

Figure 8:
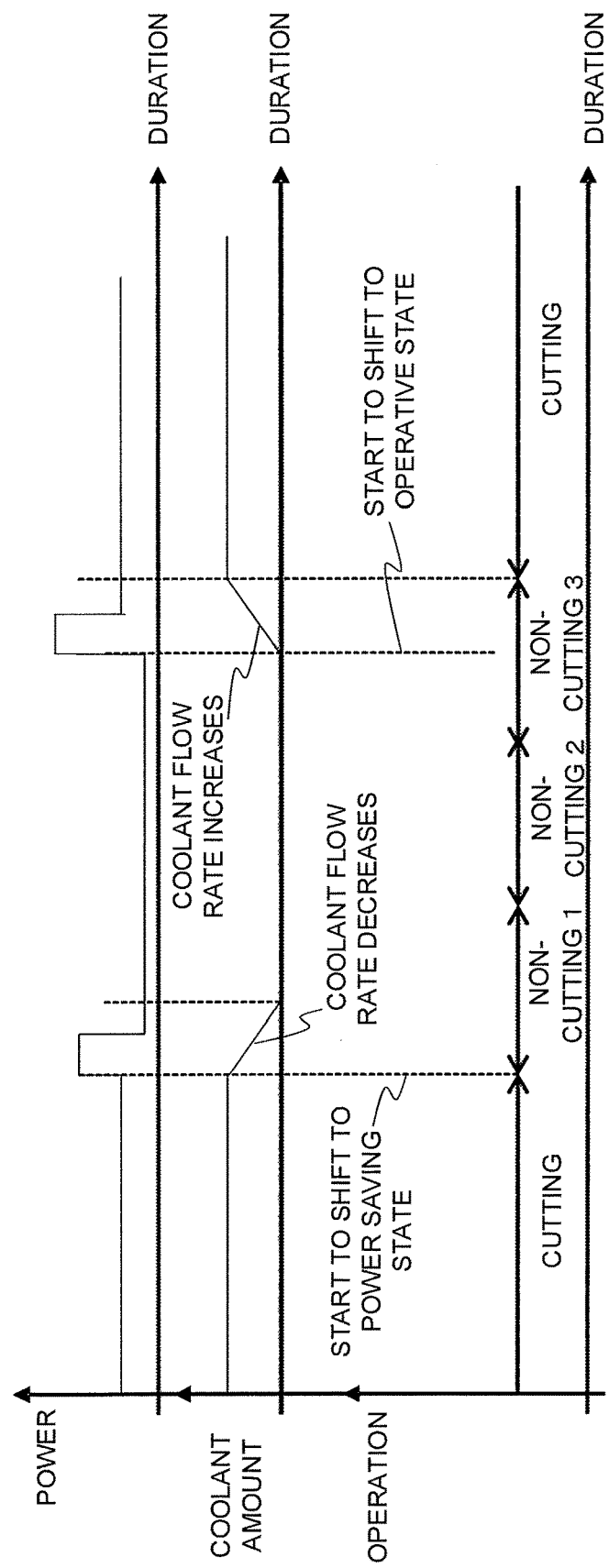
FIG. 8 is a diagram illustrating a first embodiment in which the numerical controller in FIG. 3 suppresses power consumption in a non-cutting block.

FIG. 8 illustrates an aspect of equipment operation variation control in the present embodiment.

Immediately after the non-cutting block (non-cutting 1) is started, the equipment operation variation pattern execution unit 130 executes processing of shifting the coolant apparatus to the power saving state to deactivate the coolant. At this time, the consumed power temporarily increases as a result of controllable deactivation of the coolant. The flow rate of the coolant gradually decreases and becomes 0 a given duration later. The consumed power at this time is lower than the consumed power in the operative state. The equipment operation variation pattern execution unit 130 restores the coolant apparatus to the operative state a given duration (that is, a duration needed to restore the flow rate of the coolant to the steady state) before the point in time when the non-cutting block (non-cutting 3) is ended. At this time, the consumed power temporarily increases as a result of controllable activation of the coolant. The flow rate of the coolant gradually increases and shifts to the steady state by the time when the cutting block is started.

In the present embodiment, the case of the coolant apparatus is described by way of example. However, the peripheral equipment is not limited to the coolant apparatus. Any peripheral equipment, which is used during the cutting period and is not used, or may not be used, during the non-cutting period, is applicable. The power saving state is not limited to the state where the peripheral equipment is stopped but may be any state so long as the power saving state allows power consumption to be more significantly suppressed than the normal operative state.

Embodiment 2

In this embodiment, the numerical controller 100 suppresses power consumption by reducing the rotation speed of the spindle in the non-cutting block.

In the present embodiment, the program analysis unit 110 evaluates the consumed power in the operation of shifting the axis operation to the power saving state and then restoring the axis operation to the original operative state, to create an operation variation pattern. In this case, the axis operation need not comply with the acceleration speed and the time constant for the axis set in the numerical controller 100, but may be controlled using any operation variation pattern so long as the control enables a reduction in consumed power.

For example, for an axis operation of an axis, such as spindle, which operates at a constant rotation speed, the program analysis unit 110 may simply cut a driving power to set the axis to a free run state to frictionally decelerate the axis instead of decelerating the axis to allow the axis to operate at a constant speed. In this case, pre-measuring and storing the friction-based deceleration speed allows the program analysis unit 110 to determine the rotation speed of the axis at any point in time based on the duration elapsed since power interruption. The program analysis unit 110 then estimates the power to be consumed to accelerate the spindle so as to increase the rotation speed to a value for the steady state. This corresponds to the consumed power in this operation variation pattern.

Now, an estimation method for the consumed power will be described for a case where the rotation speed of the spindle is reduced from $\omega 1$ to $\omega 2$ and for a case where rotation speed of the spindle is increased from $\omega 2$ to $\omega 1$. Physical characteristics inherent in the motor are defined as follows.

Rotation speed of the spindle: $\omega 1$, $\omega 2$ (rad/sec)
Winding resistance of the spindle: R ($\Omega$)
Torque constant: Kt(Nm/A)
Load inertia: J(kgm$^2$)
Friction torque of the spindle: Tf(Nm)
Acceleration of the spindle: a(rad/sec$^2$)
In this case, a current I(A) for acceleration of the spindle can be determined as follows.

$$I=(J \times a)/Kt \qquad (1)$$

With only a copper loss taken into account as a motor loss, the amount of power Ea (Ws) consumed during acceleration of the spindle from $\omega 2$ to $\omega 1$ can be determined as follows using an acceleration and deceleration duration tf1.

$$Ea = 1/2 \times J \times (\omega 1^2 - \omega 2^2) + R \times I^2 \times tf1 \qquad (2)$$
$$= J \times (\omega 1^2 - \omega 2^2)/2 + (R \times J^2 \times (\omega 1 - \omega 2)/Kt^2) \times a$$

When a coefficient representing the rate of kinetic energy regenerated is denoted by Kr, the amount of power Ed (Ws) consumed during deceleration of the spindle from $\omega 1$ to $\omega 2$ can be determined as follows.

$$Ed = -1/2 \times J \times (\omega 1^2 - \omega 2^2) \times Kr + R \times I^2 \times tf1 \quad (3)$$
$$= -J \times Kr \times (\omega 1^2 - \omega 2^2)/2 + (R \times J^2 \times (\omega 1 - \omega 2)/Kt^2) \times a$$

The amount of power Ec consumed while the spindle is rotating at a constant speed ω2 can be determined as follows using a constant-speed duration tf2.

$$Ec = Tf \times \omega 2 \times tf2 + R \times (Tf/Kt)^2 \times tf2 \quad (4)$$
$$= Tf \times \omega 2 \times tf2 + R \times tf2 \times (Tf/Kt)^2$$

The amount of power Em consumed by the spindle within the execution duration T for the non-cutting block determined by the program analysis unit 110 through look-ahead can be determined as follows by adding together the amounts of power consumed for acceleration and deceleration of the spindle and for operation at a constant speed.

$$Em = Ea + Ed + Ec \quad (5)$$

The program analysis unit 110 checks whether or not there is any rotation speed ω2 at which the amount of power Em consumed by the spindle is lower than the power $E = Tf \times \omega 1 \times T + R \times T \times (Tf/Kt)^2$ consumed within the execution duration T for the non-cutting block when the rotation speed ω1 is specified in a spindle rotation command S in the operative state (E>Em). When there is such a rotation speed ω2, the program analysis unit 110 determines the rotation speed ω2 at which the consumed power is lowest. If ω1=ω2, E=Em.

The program analysis unit 110 creates a spindle operation variation pattern based on the rotation speed ω2 and an acceleration and deceleration duration and a constant-speed duration determined from the rotation speed ω2.

In the present embodiment, the program execution unit 120 references the upper limit value of the motor temperature as the equipment operation variation enabling condition. At the point in time when the non-cutting block is executed, if the motor temperature for the spindle meets the equipment operation variation enabling condition, the program execution unit 120 makes an equipment operation variation pattern execution request. In response, the equipment operation variation pattern execution unit 130 starts executing the operation variation pattern for the spindle to controllably adjust the speed of the spindle to the value ω2 determined by the above-described method. In the present embodiment, the rotation speed of the spindle is the target for the operation variation control, and the motor temperature is used as the operation variation enabling condition. However, the present invention is not limited to this.

Figure 9:
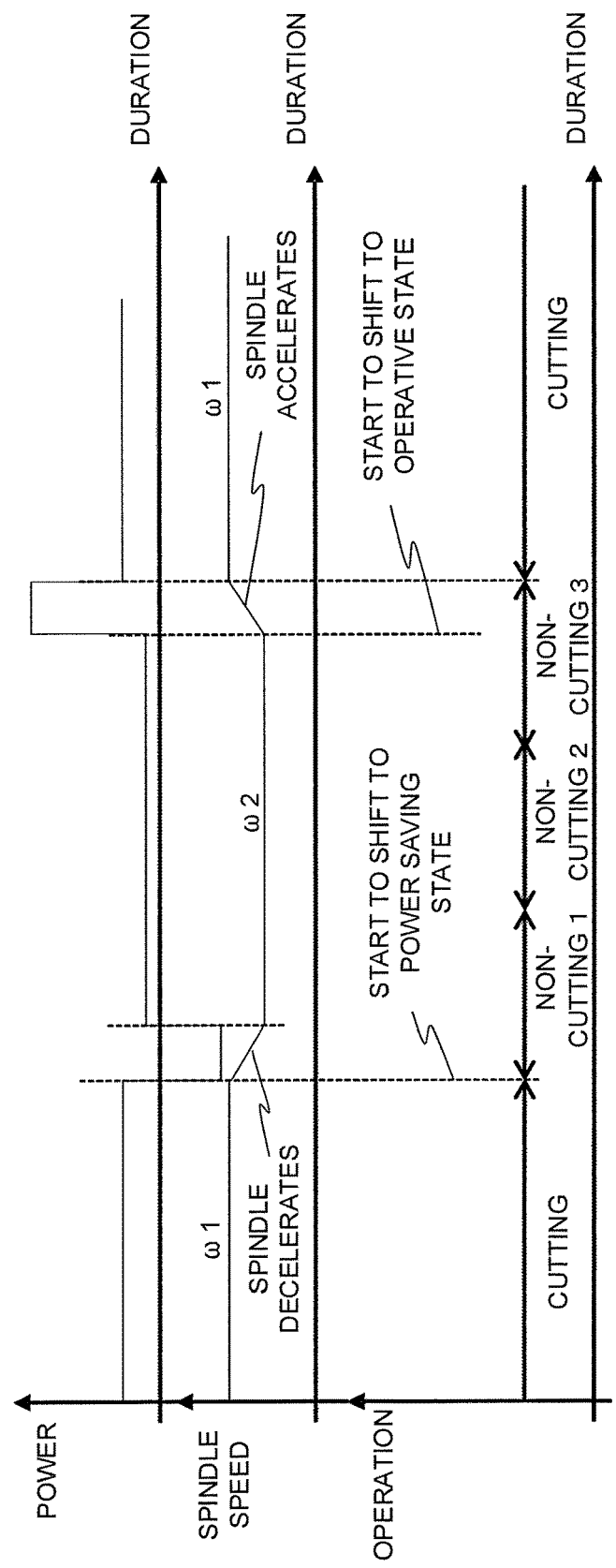
FIG. 9 is a diagram illustrating a second embodiment in which the numerical controller in FIG. 3 suppresses power consumption in the non-cutting block.

FIG. 9 illustrates an aspect of equipment operation variation control in the present embodiment. Immediately after the non-cutting block (non-cutting 1) is started, the equipment operation variation pattern execution unit 130 executes the processing of shifting the spindle to the power saving state. The rotation speed of the spindle starts to decrease from ω1 to ω2. At this time, regenerative power is generated to temporarily reduce the consumed power. The rotation speed of the spindle gradually decreases to reach ω2 a given duration later. The consumed power at this time is lower than the consumed power in the operative state. The equipment operation variation pattern execution unit 130 starts increasing the rotation speed of the spindle a given duration (that is, a duration needed to return the rotation speed of the spindle to ω1) before the point in time when the non-cutting block (non-cutting 3) is ended. At this time, the acceleration temporarily increases the consumed power. The rotation speed of the spindle gradually restores and shifts to the steady state ω1 at the point in time when the cutting block is started.

Embodiment 3

In this embodiment, the numerical controller 100 suppresses power consumption in the non-cutting block by stopping a continuous oscillating operation of the axis such as a chopping operation for grinding. Furthermore, in the present embodiment, no equipment operation variation enabling condition is set.

An operation duration T needed per reciprocation during the oscillating operation can be determined as follows using a command speed Vo for the oscillating operation, an oscillating distance Do, and a duration Toa needed for acceleration and deceleration for the oscillating operation. (For both acceleration and deceleration, the same linear acceleration and deceleration pattern is used.)

$$T = 2 \times \{(Do - Vo \times Toa)/Vo + Toa\}$$

The power consumed per reciprocation during the oscillating operation may be derived in accordance with the equation described above in Embodiment 2 or using a different technique (see, for example, Japanese Patent Application Laid-open No. 2010-240800) or the value of power actually consumed per reciprocation and measured before machining or during cutting.

The program analysis unit 110 determines an equipment operation variation pattern using an execution duration Tr of the non-cutting block, consumed power Er consumed in the steady state during the duration Tr, a duration Td and consumed power Ed needed for deceleration from the steady state to deactivate state, a duration Ta and consumed power Ea needed for acceleration from a deactivated state to the steady state, and the duration Ts of the deactivated state and consumed power Es in the deactivated state (assumed to be 0). In this case, the axis constantly performs the oscillating operation, and thus, the program analysis unit 110 determines power saving to be possible if the duration Tr is longer than the duration Toa of acceleration and deceleration for the oscillating operation (Tr>Toa). Then, an equipment operation variation pattern can be created.

Embodiment 4

In Embodiment 4, an example is illustrated where the numerical controller 100 suppresses power consumption in the non-cutting block by stopping an axis operation in which the tool makes a continuous circular motion to form a groove wider than the tool. In the present embodiment, no equipment operation variation enabling condition is set.

The operation duration T per rotation during the circular motion can be determined as follows using a command speed Vc for the circular motion and a radius R of a circular arc.

$$T = Vc/2\pi R$$

Separately from the acceleration and deceleration for the circular motion, the deceleration from the command speed Vc to deactivation stop and the acceleration to the command speed Vc are performed in accordance with an acceleration and deceleration time constant Ta for two axes of the circular arc.

The amount of power E1 consumed per rotation during the circular motion and the amount of consumed power needed for deceleration from the command speed Vc to deactivation and the acceleration to the command speed Vc may be described in accordance with the equation described above in Embodiment 2 or using a different technique (see, for example, Japanese Patent Application Laid-open No. 2010-240800) or the value of power actually consumed per reciprocation and measured before machining or during cutting.

The program analysis unit 110 determines an equipment operation variation pattern using an execution duration Tr of the non-cutting block, consumed power Er consumed in the steady state during the duration Tr, a duration Td and consumed power Ed needed for deceleration from the steady state to deactivate state, a duration Ta and consumed power Ea needed for acceleration from a deactivated state to the steady state, and the duration Ts of the deactivated state and consumed power Es in the deactivated state (assumed to be 0). In this case, the axis constantly makes the circular motion, and thus, when E1>Ed+Ea, the program analysis unit 110 determines power saving to be possible if Tr>Td+Ta. Then, an equipment operation variation pattern can be created.

In the above-described embodiments, the numerical controller 100 calculates and compares the consumed power needed to shift the equipment to the power saving state and the power consumed when the operative state is maintained, and varies the operation of the equipment in accordance with the equipment operation variation pattern if the consumed power is lower when the equipment is shifted to the power saving state than when the operative state is maintained. This allows avoidance of an adverse increase in consumed power as a result of shifting of the equipment to the power saving state.

When the non-cutting block is executed, the numerical controller 100 autonomously shifts the equipment to the power saving state without the need to revise the machining program. This eliminates the need for the user to execute control command to the equipment. A reduction in consumed power can be achieved without affecting the cycle time.

The numerical controller 100 shifts the equipment to the power saving state when the equipment operation variation enabling condition is met. This enables power consumption to be suppressed with a possible adverse effect on the subsequent machining and the state of the equipment avoided.

The present invention is not limited to the above-described various embodiments. Changes such as substitution, omission, addition, and reordering of components may be made to the embodiments without departing from the spirits of the invention.

The invention claimed is:

1. A numerical controller comprising:
   a program analysis unit that analyzes a machining program; and
   a program execution unit that outputs a program execution command ire accordance with the machining program,
   wherein the program analysis unit looks ahead the machining program to detect one non-cutting block or a plurality of consecutive non-cutting blocks, and calculates first consumed power needed during an execution duration of the non-cutting block to shift equipment to a power saving state, operate the equipment in the power saving state, and restore the equipment to a state before the shifting to the power saving state, and second consumed power needed during the execution duration of the non-cutting block to operate the equipment without shifting the equipment to the power saving state, and
   when the first consumed power is lower than the second consumed power, the program analysis unit creates an equipment operation variation pattern according to which the equipment is to be shifted to the power saving state, operated in the power saving state, and then restored to the state before the shifting to the power saving state,
   wherein the power saving state is a state where a continuous axis operation including an oscillating operation or a circular motion is changed, or a state where an operation of a peripheral equipment including a coolant apparatus, a cutting chip discharge apparatus, an air blow output apparatus and a machining state monitoring apparatus is changed.

2. The numerical controller according to claim 1, further comprising an equipment operation variation pattern execution unit for shifting the equipment to the power saving state, operating the equipment in the power saving state, and restoring the equipment to the state before the shifting to the power saving state, in accordance with the equipment operation variation pattern,
   wherein the program execution unit operates the equipment operation variation pattern execution unit when the non-cutting block is executed.

3. The numerical controller according to claim 2, wherein the program execution unit prevents the equipment operation variation pattern execution unit from operating when a temperature of a tool, a temperature of a work piece, an amount of cutting chips, a temperature of a shaft, or a loading state of the shaft exceeds a predetermined threshold.

4. The numerical controller according to claim 1,
   wherein the equipment operation variation pattern is created based en a shifting duration and the execution duration of the non-cutting block, and
   wherein the shifting duration is the duration for shifting from the power saving state to an operated state.

5. The numerical controller according to claim 1,
   wherein the program analysis unit selects the equipment operation variation pattern among a plurality of equipment variation patterns based on power consumed in each of the plurality of equipment variation patterns.

* * * * *